(12) United States Patent
Raney

(10) Patent No.: US 9,781,044 B2
(45) Date of Patent: Oct. 3, 2017

(54) AUTOMATED DISCOVERY AND FORWARDING OF RELEVANT NETWORK TRAFFIC WITH RESPECT TO NEWLY CONNECTED NETWORK TOOLS FOR NETWORK TOOL OPTIMIZERS

(71) Applicant: Anue Systems, Inc., Austin, TX (US)

(72) Inventor: Kristopher Raney, Austin, TX (US)

(73) Assignee: Anue Systems, Inc., Austin, TX (US)

( * ) Notice: Subject to any disclaimer, the term of this patent is extended or adjusted under 35 U.S.C. 154(b) by 195 days.

(21) Appl. No.: 14/332,818

(22) Filed: Jul. 16, 2014

(65) Prior Publication Data

US 2016/0020981 A1 Jan. 21, 2016

(51) Int. Cl.
| | |
|---|---|
| *G06F 13/00* | (2006.01) |
| *H04L 12/813* | (2013.01) |
| *H04L 12/815* | (2013.01) |
| *H04L 12/715* | (2013.01) |
| *H04L 12/751* | (2013.01) |
| *H04L 12/26* | (2006.01) |

(52) U.S. Cl.
CPC ............ *H04L 47/20* (2013.01); *H04L 43/028* (2013.01); *H04L 45/02* (2013.01); *H04L 45/64* (2013.01); *H04L 47/22* (2013.01); *H04L 43/12* (2013.01)

(58) Field of Classification Search
CPC . H04L 12/2602; H04L 29/06; H04L 29/0653; H04L 29/08072; H04L 41/22; H04L 43/00; H04L 45/00; H04L 47/10; H04L 49/3009; H04L 43/12; H04L 43/028; H04L 45/02; H04L 45/64; H04L 47/20; H04L 47/22

USPC .......................................... 370/392; 709/224
See application file for complete search history.

(56) References Cited

U.S. PATENT DOCUMENTS

| | | | |
|---|---|---|---|
| 5,185,860 | A | 2/1993 | Wu |
| 5,515,376 | A | 5/1996 | Murthy et al. |
| 6,321,259 | B1 | 11/2001 | Oullette et al. |
| 6,578,147 | B1 | 6/2003 | Shanklin et al. |
| 6,785,286 | B1 | 8/2004 | O'Keeffe et al. |

(Continued)

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.

(Continued)

*Primary Examiner* — Robert B Harrell
(74) *Attorney, Agent, or Firm* — Egan Peterman Enders Huston

(57) ABSTRACT

Network tool optimizers and related methods are disclosed that provide automated discovery and configuration of network tool devices. The disclosed embodiments include tool processors having tool discovery engines and tool configuration engines that provide discovery of tool information and generation of rules for filter engines within the network tool optimizer (NTO) so that relevant network traffic received by the NTO is forwarded to network tool devices connected to the NTO. New network traffic sources connected to the NTO can also be automatically configured to forward relevant traffic to the network tool devices based upon the discovered tool information. Further, a database of tool information can be stored within the NTO and can be used by the NTO in determining relevant traffic for connected tool devices. A variety of different implementations can use the automatic tool discovery and configuration embodiments.

30 Claims, 9 Drawing Sheets

(56) References Cited

U.S. PATENT DOCUMENTS

| | | |
|---|---|---|
| 6,795,403 B1 | 9/2004 | Gundavelli |
| 6,839,349 B2 | 1/2005 | Ambe et al. |
| 6,853,623 B2 | 2/2005 | Nederveen et al. |
| 6,901,517 B1 | 5/2005 | Redmore |
| 6,920,112 B1 | 7/2005 | McCloghrie et al. |
| 6,954,775 B1 | 10/2005 | Shanklin et al. |
| 6,996,779 B2 | 2/2006 | Meandzija et al. |
| 7,016,980 B1 | 3/2006 | Mayer et al. |
| 7,027,437 B1 | 4/2006 | Merchant et al. |
| 7,142,518 B2 | 11/2006 | Mitchell |
| 7,143,196 B2 | 11/2006 | Rimmer et al. |
| 7,245,620 B2 | 7/2007 | Shankar |
| 7,254,114 B1 | 8/2007 | Turner et al. |
| 7,310,306 B1 | 12/2007 | Cheriton |
| 7,418,486 B2 | 8/2008 | Brubacher et al. |
| 7,424,018 B2 | 9/2008 | Gallatin et al. |
| 7,554,984 B2 | 6/2009 | Kalkunte et al. |
| 7,688,727 B1 | 3/2010 | Ferguson et al. |
| 7,769,873 B1 | 8/2010 | Mackie |
| 7,889,711 B1 | 2/2011 | Minei et al. |
| 7,917,647 B2 | 3/2011 | Cooper et al. |
| 8,018,943 B1 | 9/2011 | Pleshek et al. |
| 8,098,677 B1 | 1/2012 | Pleshek et al. |
| 8,200,203 B1 | 6/2012 | Christensen et al. |
| 8,447,718 B2 | 5/2013 | Norton et al. |
| 8,635,313 B2 | 1/2014 | Larsen et al. |
| 2001/0022786 A1 | 9/2001 | King et al. |
| 2001/0055274 A1 | 12/2001 | Hegge et al. |
| 2002/0186259 A1 | 12/2002 | Meandzija et al. |
| 2003/0046657 A1 | 3/2003 | White |
| 2003/0074421 A1 | 4/2003 | Kusano et al. |
| 2004/0003094 A1 | 1/2004 | See |
| 2004/0042470 A1 | 3/2004 | Cooper et al. |
| 2004/0103321 A1 | 5/2004 | Wesinger, Jr. et al. |
| 2004/0107361 A1 | 6/2004 | Redan et al. |
| 2004/0196841 A1 | 10/2004 | Tüdor et al. |
| 2005/0053073 A1 | 3/2005 | Kloth et al. |
| 2005/0138157 A1 | 6/2005 | Jung et al. |
| 2005/0182950 A1 | 8/2005 | Son et al. |
| 2006/0256788 A1 | 11/2006 | Donahue |
| 2008/0008202 A1 | 1/2008 | Terrell et al. |
| 2008/0072292 A1 | 3/2008 | Narjala |
| 2008/0222731 A1 | 9/2008 | Dowd et al. |
| 2009/0007021 A1 | 1/2009 | Hayton |
| 2009/0013052 A1 | 1/2009 | Robarts et al. |
| 2009/0150996 A1 | 6/2009 | Haswell |
| 2009/0172148 A1 | 7/2009 | Underwood |
| 2009/0327903 A1 | 12/2009 | Smith et al. |
| 2010/0027554 A1 | 2/2010 | Kuthan et al. |
| 2010/0332618 A1 | 12/2010 | Norton et al. |
| 2011/0317694 A1 | 12/2011 | Pleshek et al. |
| 2012/0079107 A1 | 3/2012 | Williams et al. |
| 2012/0106354 A1 | 5/2012 | Pleshek et al. |

OTHER PUBLICATIONS

A. Esson and J. Mannos, "Broadcom BCM5600 StrataSwitch; A Highly Integrated Ethernet Switch on a Chip," Broadcom Corporation, Hot Chips Aug. 17, 1999.

J. Magee, "The Case for IDS Balancing vs. a Switch," Top Layer Networks, Inc., May 2003.

G. Marshall, SC Magazine Reprint, "Attack Mitigator," Aug. 2002.

F. Muhtar, "Appliances to Boost Network Defence," CyberSecurity Malaysia, Nov. 26, 2001.

National Information Assurance Partnership, "Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)," Report No. CCEVS-VR-04-0074, National Institute of Standards and Technology; National Security Agency, Sep. 3, 2004.

Radware, "Radware's Smart IDS Management; FireProof and Intrusion Detection Systems; Deployment and ROI," North America Radware, Inc.; International Radware, Ltd., Aug. 21, 2002.

SC Magazine Reprint, "IDS Balancer 3500 Appliance," Jul. 2002.

Top Layer Networks, Inc., "Top Layer Advances Scaleable Intrusion Detection With Industry Leading Multi-Gigabit Offering," Press Release, Mar. 10, 2003.

Top Layer Networks, Inc., "Product Enhancements Optimize Existing Network Intrusion Detection and Prevention Environments," Press Release, Aug. 18, 2003.

Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.

Top Layer Networks, Inc., "IDS Balancer 3.0 Delivers Ultimate Flexibility in Selecting, Filtering and Distributing Network Traffic," Press Release, Oct. 20, 2004.

Top Layer Networks, Inc., "IDS Balancer; Aggregation, Filtering, & Load Appliance," internet advertisement, www.TopLayer.com., 2004.

Top Layer Networks, Inc., "APP Switch 2500; The Original Top Layer Device to Perfect the Art of Network Security," internet advertisement, www.TopLayer.com.

G. Hilton, et al., "Filtering Path View Graphical User Interfaces and Related Methods," U.S. Appl. No. 12/462,222, filed Jul. 31, 2009.

AUTOMATED DISCOVERY AND FORWARDING OF RELEVANT NETWORK TRAFFIC WITH RESPECT TO NEWLY CONNECTED NETWORK TOOLS FOR NETWORK TOOL OPTIMIZERS

TECHNICAL FIELD OF THE INVENTION

This invention relates to managing network packets and providing network packets to network monitoring tools.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switches. For example, certain network switches produced by Cisco Systems include SPAN ports to which traffic on the switches are mirrored. It is also noted that other packet monitoring or access methods may also be used to acquire copies of network packets being communicated within a network infrastructure.

To help alleviate the problem of limited access to network packets for monitoring, tool aggregation devices have been developed that allow shared access to the monitored network packets. These tool aggregation devices allow users to obtain packets from one or more network monitoring points (e.g., network hub, TAP, SPAN port, etc.) and to forward them to different monitoring tools. U.S. Pat. No. 8,018,943 and U.S. Pat. No. 8,098,677 describe example embodiments for network tool optimizers that provide solutions for packet filtering and provide, in part, configuration of user-define filters, automatic creation of filter engine forwarding rules, automatic handling of filter overlaps, graphical user interfaces (GUIs) for filter creation, and other features. U.S. Pat. No. 8,018,943 and U.S. Pat. No. 8,098,677 is each hereby incorporated by reference in its entirety.

SUMMARY OF THE INVENTION

Network tool optimizers and related methods are disclosed that provide automated discovery and configuration of network tool devices. The disclosed embodiments include tool processors having tool discovery engines and tool configuration engines that provide discovery of tool information and generation of rules for filter engines within the network tool optimizer (NTO) so that relevant network traffic received by the NTO is forwarded to network tool devices connected to the NTO. New network traffic sources connected to the NTO can also be automatically configured to forward relevant traffic to the network tool devices based upon the discovered tool information. Further, a database of tool information can be stored within the NTO and can be used by the NTO in determining relevant traffic for connected tool devices. A variety of different implementations can take advantage of the automatic tool discovery and configuration techniques described herein. Further, different features and variations can be implemented, as desired, and related systems and methods can be utilized, as well.

For one embodiment, a method for operating a network tool optimizer (NTO) device is disclosed that includes discovering relevant traffic information for a network tool device when the network tool device is connected to a port for a network tool optimizer (NTO) device, automatically generating packet forwarding rules for one or more filter engines for the NTO device based upon the relevant traffic information where the packet forwarding rules are configured to forward relevant network traffic to the network tool device, applying the packet forwarding rules to the one or more filter engines, receiving network input traffic at one or more input ports for the NTO device, and forwarding relevant network traffic from the network input traffic to the network tool device using the one or more filter engines.

In another embodiment, the discovering step includes automatically obtaining prior relevant traffic information related to a previously connected network tool device and using this prior relevant traffic information as relevant traffic information for the network tool device. Further, the method can also include receiving new network input traffic at an input port for the NTO device and forwarding relevant network traffic from the new network input traffic to the network tool device. Still further, the method can include analyzing packets within the network input traffic to identify packet types within the network input traffic, determining if one or more of the identified packet types represent relevant traffic for the network tool device, and forwarding relevant network traffic from the network input traffic to the network tool device based upon the determination.

In a further embodiment, the discovering step includes automatically obtaining the relevant traffic information from a database stored within a data storage medium for the NTO device. In addition, the method can also include updating the database over time during operation of the NTO device. In further embodiments, the method can include using tool identification information received from the network tool device to automatically obtain the relevant traffic information from the database. Still further, the method can include using tool identification information received from a user of the NTO device to automatically obtain the relevant traffic information from the database.

In a still further embodiment, the discovering step includes obtaining the relevant traffic information from the network tool device. In addition, the method can include receiving the relevant traffic information from the network tool device through an application programming interface for the NTO device. The method can also include storing the relevant traffic information received from the network tool device within a database stored within a data storage medium for the NTO device.

In another embodiment, the discovering step includes obtaining the relevant traffic information from a user of the NTO device. Further, the applying step can include automatically applying the packet forwarding rules without user approval based upon the relevant traffic information. Still further, the method can also include requesting user approval prior to the applying step and conducting the applying step only if user approval is received. In addition, the method can also include requesting user approval by displaying a message to a user through a graphical user interface.

For one embodiment, a network tool optimizer (NTO) device is disclosed that includes one or more input ports, one or more output ports, packet forwarding circuitry configured to forward network packets from the input ports to the output ports, one or more filter engines configured to control at least in part how the packet forwarding circuitry forwards packets between input ports and output ports, and a tool processor including a tool discovery engine and a tool configuration engine. The tool discovery engine is coupled to the output ports and is configured to discover relevant traffic information for a network tool device when the network tool device is connected to one of the output ports. The tool configuration engine is coupled to the one or more filter engines and is configured to automatically generate packet forwarding rules for the filter engines based upon the relevant traffic information and to apply the packet forwarding rules to the filter engines where the packet forwarding rules are configured to forward relevant network traffic to the network tool device.

In another embodiment, the tool discovery engine is further configured to automatically obtain prior relevant traffic information related to a previously connected network tool device and to use this prior relevant traffic information as relevant traffic information for the network tool device. Further, the tool configuration engine can be further configured to forward relevant network traffic to the network tool device from new network input traffic connected to one of the input ports. Still further, the tool configuration engine can be further configured to analyze packets within network input traffic for the NTO device to identify packet types within the network input traffic, to determine if one or more of the identified packet types represent relevant traffic for the network tool device, and to forward relevant network traffic from the network input traffic to the network tool device based upon the determination.

In a further embodiment, the NTO device can also include a data storage medium, and the tool discovery engine can be further configured to automatically obtain the relevant traffic information from a database stored within the data storage medium. In addition, the tool processor can be further configured to update the database over time during operation of the NTO device. In further embodiments, the tool discovery engine can be further configured to use tool identification information received from the network tool device and to automatically obtain the relevant traffic information from the database. Still further, the tool discovery engine can be further configured to use tool identification information received from a user of the NTO device to automatically obtain the relevant traffic information from the database.

In a still further embodiment, the tool discovery engine is further configured to obtain the relevant traffic information from the network tool device. In addition, the tool discovery engine can be further configured to receive the relevant traffic information from the network tool device through an application programming interface. Further, the NTO device can include a data storage medium, and the tool processor can be further configured to store the relevant traffic information received from the network tool device within a database stored within the data storage medium.

In another embodiment, the tool discovery engine is further configured to obtain the relevant traffic information from a user of the NTO device. Further, the tool configuration engine can be further configured to automatically apply the packet forwarding rules without user approval. Still further, the tool configuration engine can be further configured to request user approval prior and to apply the packet forwarding rules only if user approval is received. In addition, the tool configuration engine can be further configured to request user approval using a message displayed through a graphical user interface.

Different features and variations can be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1:
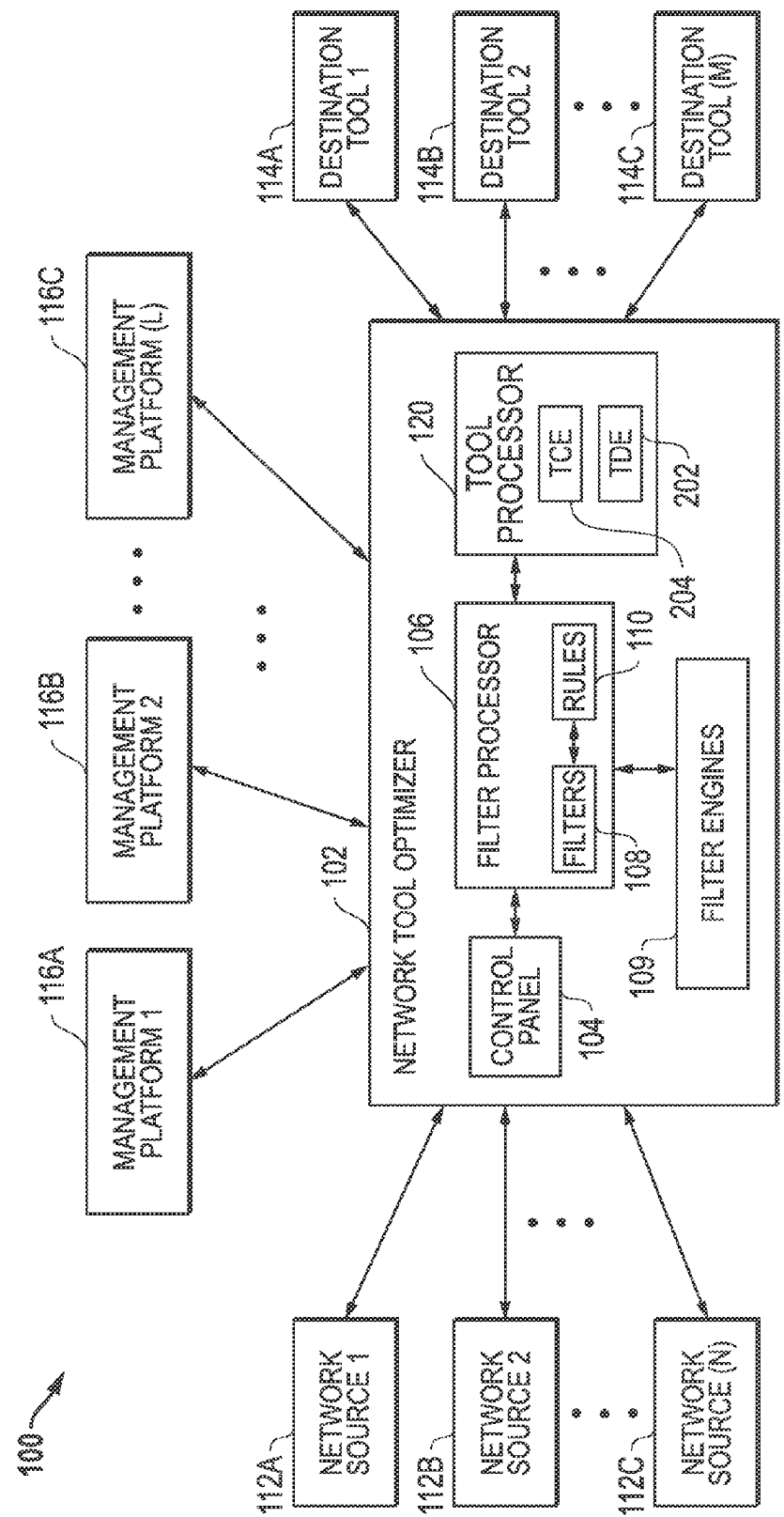
FIG. 1 is a block diagram of an example network monitoring system including a network tool optimizer having a tool processor that further includes a tool discovery engine and a tool configuration engine.

Network tool optimizers and related methods are disclosed that provide automated discovery and configuration of network tool devices. The disclosed embodiments include tool processors having tool discovery engines and tool configuration engines that provide discovery of tool information and generation of rules for filter engines within the network tool optimizer (NTO) so that relevant network traffic received by the NTO is forwarded to network tool devices connected to the NTO. New network traffic sources connected to the NTO can also be automatically configured to forward relevant traffic to the network tool devices based upon the discovered tool information. Further, a database of tool information can be stored within the NTO and can be used by the NTO in determining relevant traffic for connected tool devices. A variety of different implementations can take advantage of the automatic tool discovery and configuration techniques described herein. Further, different features and variations can be implemented, as desired, and related systems and methods can be utilized, as well.

According to one aspect of the present invention, a network tool optimizer (NTO) is a network packet forwarding device that includes one or more input ports configured to receive network traffic, such as network packets communicated through a packet-based communication network, and one or more output ports configured to provide filtered network traffic to one or more network tools. Network traffic can be received at the input ports for the NTO from external or internal probes or taps within a communication network and/or other traffic sources. One or more network tool devices, such as traffic monitoring tools, can be connected to the output ports of the NTO. As described in more detail below, the NTO can be configured to discover information about newly connected tool devices and/or newly connected network traffic and to automatically configured packet forwarding rules for filter engines within the NTO so that relevant traffic is forwarded to tool devices connected to the NTO. For further embodiments, network tool devices can be adapted to communicate tool device profile information as well as network traffic-of-interest (TOI) information directly to the NTO through bi-directional output ports or through other interfaces for the NTO. For example, the NTO may expose an API (application programming interface) through which this tool information can be communicated by the tool device to the NTO. Other techniques could also be used to communicate tool information from the network tool device to the NTO.

With respect to tool information communicated, the network tool can communicate tool operational information to the NTO that describes the type of tool (e.g., monitoring system), the manufacturer for the tool, the model number of the tool, bandwidth limitations for the tool such as the maximum communication bandwidth requirements of the tool, the types of network protocols that the tool is capable of handling, the types of application protocols that the tool of capable of handling, TOI for the tool, and/or other tool related information. With respect to TOI information for a network tool device, the TOI information can include network traffic types that are relevant to the operations of the tool. For example, the TOI information for a given tool may include email traffic (e.g., IMAP, SMTP, etc.), streaming video traffic (e.g., RTSP, etc.), streaming audio traffic, voice traffic, web browsing traffic (e.g., HTTP, etc.), and/or other traffic types or combinations of traffic types communicated through the communication network that are relevant to the operations of a network tool device.

In further embodiments as described below, the NTO maintains a database of tool information for different tools and/or tool types within a data storage system for the NTO. If a tool connects to the NTO and provides information that identifies the tool, the NTO can use this tool identity information to search the internal tool properties database for matching records. If a match is found, the stored tool information relating to the match can be used to configure packet forwarding rules for filter engines within the NTO to forward relevant network traffic to the tool device according to stored tool information. The stored tool information in the database may include tool identification information, TOI information, tool capabilities, bandwidth limitations, and/or other tool related information. Further, when a tool connects to the NTO and communicates TOI and/or other tool information to the NTO, this tool information can be stored in the tool properties database and later used to configure network traffic for additional similar tool devices that are subsequently connected to the NTO. As such, the tool information for a previously connected tool device can be used by the NTO to dynamically direct network traffic to a newly connected tool device.

In part, the NTO embodiments described herein include a filter processor that automatically generates one or more packet forwarding rules based upon filters that are defined within the NTO. These forwarding rules are configured to forward relevant network traffic received by the NTO on one or more input ports to one or more output ports for attached network tool devices. The filter processor applies these packet forwarding rules to filter engines within the NTO so that relevant network traffic matching the TOIs for the network tool devices are forwarded to the network tool device. Further, the NTO can characterize network traffic received on each input port, determine what portions of this traffic are relevant to TOIs for attached network tool devices, and then generate and apply packet forwarding rules to forward relevant network traffic to the appropriate network tools devices connected to output ports for the NTO.

As described herein, therefore, NTO embodiments provide automated tool discovery and configuration of network traffic for network tool devices connected to the NTO. This automated discovery can be implemented using tool information stored in a database for known tool device types, using an API through which network tools can communicate tool information such as TOIs directly to the NTO, using tool information entered by a user and stored within the NTO, and/or using other desired techniques. Once the tool information such as TOI information is determined for a network tool device, the NTO can analyze its current network traffic and select appropriate packet types within the network traffic that match the TOI for the tool device and then forward this relevant traffic to the network tool device. In addition, a notification message can be provided through a user interface that matching traffic has been found for the network tool device, and the user can then determine whether or not this traffic is to be forwarded to the network tool device. Other variations can also be implemented.

Example embodiments that provide automatic discovery and configuration of network tools connected to NTOs are now described further with respect to FIGS. 1, 2A-B, and 3. Other embodiments could also be implemented while still taking advantage of the automated tool discovery and configuration techniques described herein.

FIG. 1 is a block diagram of an example network monitoring system 100 including a network tool optimizer 102 having a tool processor 120 that further includes a tool discovery engine (TDE) 202 and a tool configuration engine (TCE) 204. As described in more detail below, the tool discovery engine (TDE) 202 automatically determines information about the tools that have been connected and/or are being connected to the NTO 102. This tool information can be determined, for example, by using tool identification information reported to the NTO 102, by providing an API (application programming interface) through which the tools can communicate information about the tool, by using a database of tool information about known tools, and/or using other desired techniques to determine tool information. Once this tool information is determined, the tool discovery engine (TDE) 202 further identifies traffic-of-interest (TOI) for the tool that represents the network traffic that is relevant to the operations of the tool. This TOI information can be communicated directly from the tool, can be obtained from a database of TOI information stored on the NTO 102, and/or can be determined using other techniques. The tool configuration engine (TCE) 204 then uses the tool information for the tool to automatically define filters and/or automatically suggest filters that will forward relevant network traffic to the network tool. In this way, relevant traffic matching the TOIs for a tool device connected to the NTO 102 can be discovered and automatically forwarded to that tool device.

Advantageously, this automatic tool discovery and configuration reduces or eliminates manual filter configuration requirements for users of the NTO 102 and also provides a greater probability that relevant traffic within the network traffic received by the NTO 102 will be forwarded to the network tool device. Although the discussion below focuses on the use of a single NTO 102, it is noted that multiple different NTOs 102 could be used, as desired, within a network environment.

Looking back to FIG. 1, it is seen that the network monitoring system 100 includes a tool optimizer 102 connected to network traffic sources, network tool devices, and management platforms. In particular, a plurality of network sources 112A (SOURCE 1), 112B (SOURCE 2) . . . 112C (SOURCE (N)) provide network traffic, such as network packets within a packet-based network communication system, that is to be monitored and/or analyzed by a plurality of monitoring tools 114A (TOOL 1), 114B (TOOL 2) . . . 114C (TOOL (M)). The tool optimizer 102 includes filter processor 106 that operates to control how packets are forwarded from the network sources to the destination tools based upon packet forwarding rules 110 applied to filter engines 109. The tool optimizer 102 also allows users to view, define and/or manage filters 108 through the management platforms 16A (PLATFORM 1), 116B (PLATFORM 2) . . . 116C (PLATFORM (L)), and the tool optimizer 102 automatically generates packet forwarding rules 110 based upon the filters 108. Once generated, these packet forwarding rules 110 are applied by the filter processor 106 to filter engines 109. The filter engines 109 are then used to determine how packets are forwarded by the NTO 102 from the network sources 112A, 112B . . . 112C to the destination tools 114A, 114B . . . 114C.

The tool optimizer 102 also includes a control panel module 104 that allows one or more management platforms 116A (PLATFORM 1), 116B (PLATFORM 2) . . . 116C (PLATFORM (L)) to connect to tool optimizer 102 and to manage the operation of the tool optimizer 102. For example, using one or more of the management platforms, users can view, create and/or manage the filters 108 which indicate how packets are forwarded from one or more network sources 112A, 112B . . . 112C to one or more destination tools 114A, 114B . . . 114C. Further, the control panel module 104 can in part provide user interfaces (UIs) such as graphical user interfaces (GUIs) that allow the management platforms 116A, 116B . . . 116C to view, create and/or manage the filters 108.

It is noted that the network traffic, such as network packets, received from sources 112A, 112B . . . 112C can be obtained from network flows within the network infrastructure for the network monitoring system 100 through one of a variety of techniques and devices. These techniques and devices can include, for example, receiving traffic from network TAPs (test access ports), from SPAN (switched port analyzer) ports on network switches, and/or from other devices or systems that copy packets or packet contents from network traffic flows and make them available for other devices and systems. It is also noted that the connections and network communications described herein can include wired, wireless, and/or combinations of wired and wireless network communications among network-connected devices or systems and can include communications through one or more intervening devices or systems, such as firewalls, routers, switches, and/or other network-connected devices or systems. It is further noted that the control panel 104 for the NTO 102 can be implemented as a web interface that can be accessed through a network browser (e.g., MICROSOFT Internet Explorer or MOZILLA Firefox) by other network-connected processing systems. For example, the NTO 102 can be configured to automatically download a control panel software application to the management platforms 116A, 116B . . . 116C when a network browser operating on the management platform connects to an IP (internet protocol) address for the NTO 102. This download can occur, for example, the first time the network browser connects, and the control panel 104 can then be stored locally by the management platform. The management platforms 116A, 116B . . . 116C can be, for example, personal computer systems, server systems, and/or other processing systems running WINDOWS operating systems, LINUX operating systems, and/or other operating system as desired. In one embodiment, the control panel 104 can in part be downloaded as JAVA-based software code or modules. Other implementations could also be implemented.

It is further noted that the network monitoring system 100 can include any of a wide variety of systems that are connected within a network environment. These systems can include server systems, data storage systems, desktop computer systems, portable computer systems, network switches, broadband routers and/or any other desired processing system that is connected into a communication network, as desired. In addition to these systems, any number of network monitoring tools 114A, 114B . . . 114C can also be connected to the NTO 102, to the communication network, and/or to systems within the network. Further, the network monitoring tools 114A, 114B . . . 114C can be any of a wide variety of network related tools including traffic monitoring devices, packet sniffers, data recorders, voice-over-IP monitors, intrusion detection systems, network security systems, application monitors and/or any other desired network management or security tool device or system. Still further, as described herein, the network monitoring tools 114A, 114B . . . 114C can also be implemented as virtual instances of tool appliances within a large computing platform. It is further noted that the network communications can be based upon any desired protocol or combination of protocols including Ethernet protocols, multi-protocol label switching (MPLS) protocols, FibreChannel (FC) protocols and/or any other desired communication protocol that can be used for network communications including packet-based network communications.

It is also noted that the filters 108 as well as the forwarding engine rules 110 generated by the filter processor 106 can rely upon various portions of the content of network packets for forwarding actions. For example, network packets typically include in part a link layer header (L2), a network layer header (L3), a transport layer header (L4), and a payload, as well as other network layers (e.g., layers within the Open Systems Interconnect (OSI) model for network communications). Information pertinent to forwarding the packet, such as source ID (identifier) and destination ID and protocol type, is usually found in the packet headers. These packets may also have various other fields and information within them, such as fields including error check information, virtual local area network (VLAN) addresses, and/or other information that may be matched and used for filtering. Further, information representing the source device may include items such as the IP address of the source device or the MAC (Media Access Control) address of the source device. Similarly, information representing the destination tool device may be included within the packet such as the IP address of the destination device. It is seen, therefore, that a wide variety of source and destination identifying information may be included within the data packets, as well as other packet related information along with the data included within the payload of the packet. While the NTO embodiments described herein are primarily described with respect to packet-based communications and utilizing the information within these packets to forward the packets, the NTO embodiments can be configured to operate with respect to other types of communication protocols and are not limited to packet-based networks.

Figure 2A:
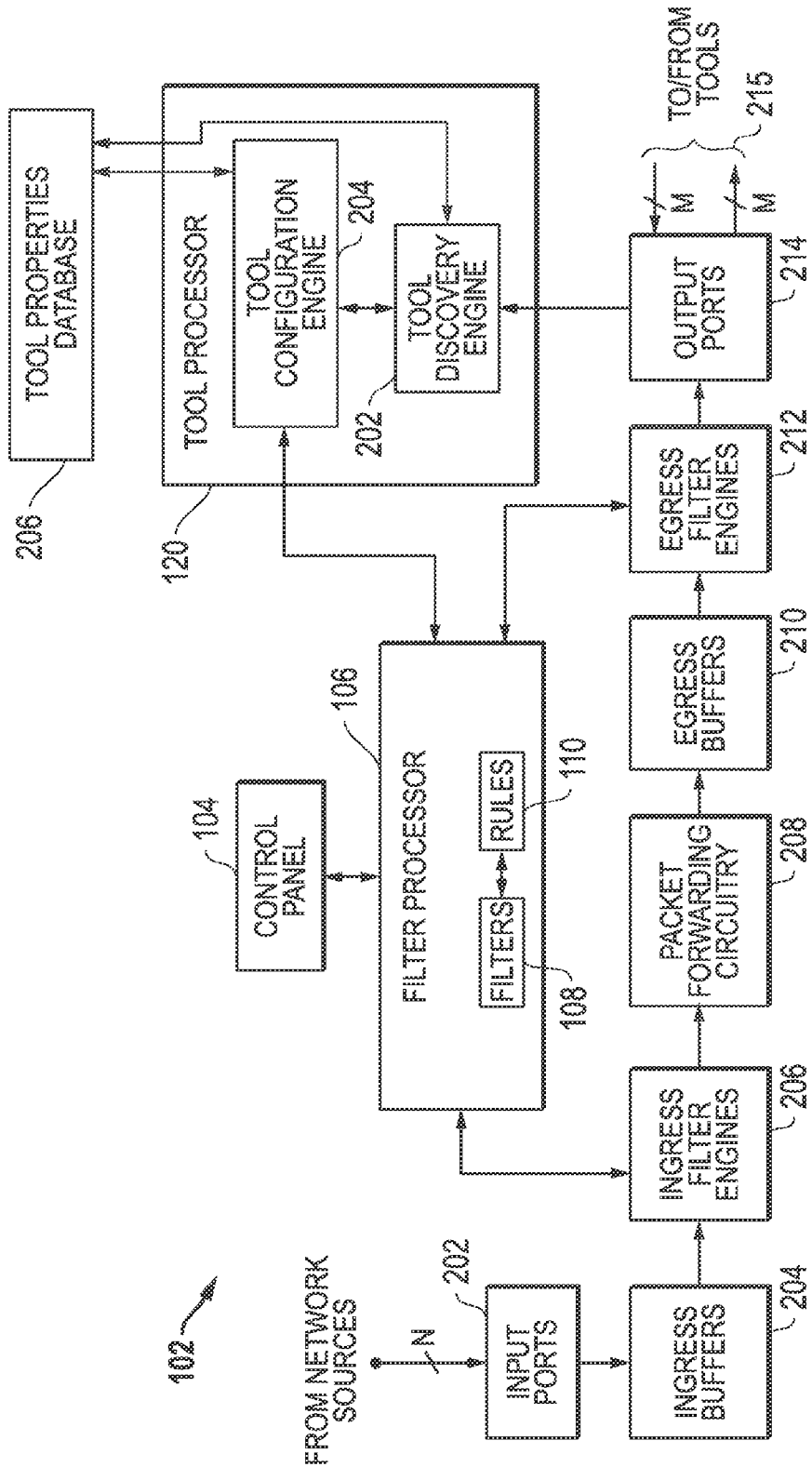
FIG. 2A is a block diagram for an example embodiment for a network tool optimizer.

FIG. 2A is a block diagram for an example embodiment for NTO 102. As described with respect to FIG. 1, the NTO 102 includes a tool processor 120 that further includes a tool discovery engine (TDE) 202 and a tool configuration engine (TCE) 204. The NTO 102 further includes a tool properties database 206 that can be used by the tool discovery engine 202 and/or the tool configuration engine 204. The control panel module 104 provides user interface(s) for management access to the management platforms 116A, 116B . . . 116C through which filters 108 can be viewed, created, and/or modified. Further, as described herein, the tool processor 120 can automatically generate or suggest one or more filters 108 based upon tool discovery. Based upon the filters 108, the NTO 102 generates forwarding rules 110 for filter engines, such as ingress filter engines 206 and egress filter engines 212, and then to apply these forwarding rules 108 to the filter engines 206/212.

In operation, the tool discovery engine (TDE) 202 determines relevant traffic and/or other information about the tools that are connected and/or are being connected to the NTO 102. Once this tool information is determined, the tool discovery engine (TDE) 202 further identifies traffic-of-interest (TOI) for the tool. This TOI and other tool related information can be communicated directly from the tool, can be obtained from the tool properties database 206 of tool related operational information, and/or can be obtained through other techniques. The tool configuration engine (TCE) 204 uses the tool information for the tool device to automatically define filters 108 and/or automatically suggest filters 108 that will forward relevant network traffic from the traffic received by the NTO 102 to the network tool device. The filter processor 106 then automatically generates packet forwarding rules 110 based upon the filters 108, and these packet forwarding rules 110 are applied to the filter engines 206/212. These forwarding rules 108 determine at least in part how the filter engines 206/212 forward packets from input ports 202 to output ports 214 for the NTO 102 through packet forwarding circuitry 208.

In operation, the packet forwarding circuitry 208 forwards packets between input ports 202 and output ports 214 based in part upon the forwarding rules 108 set up in the ingress filter engines 206 and the egress filter engines 212. For the embodiment depicted, packets from N network sources are received at the input ports 202. These packets are then stored in ingress queues or buffers 204 prior to being processed by ingress filter engines 206. Based upon ingress filter rules applied to the ingress filter engines 206, the packet forwarding circuitry 208 forwards packets to the appropriate output ports 214 through packet forwarding circuitry 208. However, prior to being sent out the output ports 214, the outgoing packets are first stored in egress queues or buffers 210 and then processed by egress filter engines 212. Based upon egress filter rules applied to the egress filter engines 212, the egress filter engines 212 forward the appropriate packets to the output ports 214. The output ports 214 are connected to network tools through M connections 215, and these connections 215 can be bi-directional connections. The filter processor 106 communicates with the ingress filter engines 206 and egress filter engines 212 to apply the forwarding rules 108 so that these filter engines 206/212 will provide the packet forwarding defined by the filters 108 with respect to the network tool devices connected to the NTO 102.

It is noted that the NTO 102 can be implemented using one or more network packet switch integrated circuits (ICs), such as are available from Broadcom Corporation. These switch integrated circuits include input port circuitry, ingress buffer circuitry, ingress filter engine circuitry, packet switch fabric circuitry, egress buffer circuitry, egress filter engine circuitry, output port circuitry, internal processors, and/or other desired circuitry. Further these switch integrated circuits can include control and management interfaces through which they can be programmed to provide desired forwarding and control. As such, the filter processor 106 can program the filter engines within the network packet switch integrated circuit with appropriate forwarding rules. The NTO 102 can also include other circuitry and components, as desired. For example, the NTO 102 can include one or more printed circuit boards (PCBs) upon which the network packet switch IC(s) are mounted, power supply circuitry, signal lines coupled to external connections, external connectors (e.g., Ethernet connectors, fiber optic connectors, or other connectors), and/or other circuitry or components, as desired. It is further noted that the NTO 102 including the filter processor 106 and the tool processor 120 can be implemented using one or more processing devices running software code or instructions. For example, the NTO 102 can include one or more processing devices such as a microprocessor, a microcontroller, a configurable logic device (e.g., CPLD (complex programmable logic device), FPGA (field programmable gate array)), and/or other processing device that is programmed to implement or control desired functionality. It is further noted that software and related processing device(s) used to implement the NTO 102 and/or its components, such as filter processor 106, tool processor 120, and the control panel 104, can be implemented as software instructions embodied in a non-transitory computer-readable medium (e.g., memory storage devices, FLASH memory, DRAM memory, reprogrammable storage devices, hard drives, floppy disks, DVDs, CD-ROMs, etc.) including instructions that cause the processing devices used by the NTO 102 to perform the processes, functions, and/or capabilities described herein.

In one embodiment for the NTO 102, a PCB can include processing devices and memory separate from a network packet switch IC. The filter processor 106 can then be configured to operate on a separate processing device, and the separate processing device can interface with an application programming interface (API) provided by the network packet switch vendor for the network packet switch IC. This API provides an abstracted programmatic interface with which to apply filter rules to the filter engines within a network packet switch to control how packets are forwarded by the packet switch IC. The tool processor 120 including the tool discovery engine (TDE) 202 and the tool configuration engine (TCE) 204 can also be configured to operate on a separate processing device, and the separate processing device can interface with the filter processor 106 and/or other circuitry within the NTO 102. As further described herein, the NTO 102 can also provide an externally available API to allow the network tool devices to communicate tool information to the NTO 102, such as TOI information, requests, commands, and/or other tool related information.

As indicated above, the NTO 102 automatically implements filters 108 as one or more forwarding rules 110 that are applied to filter engines 109, such as ingress filter engines 206 and egress filter engines 212, within a packet switch IC. The forwarding rules 108 represent internal device specific representations that are used to implement the filter engine rules. For current packet switch ICs, these device specific representations often include programming or provisioning of filter rules into ternary content-addressable memories (TCAMs) within the packet switch ICs. A filter rule typically includes a predicate and one or more action(s). The predicate is one or more traffic-matching criteria that are logically AND-ed together (e.g., TCAM matching criteria such as VLAN ID or Source/Destination IP address). Each predicate compares a key to a value. The key is computed by selecting fields from packets based on protocol and content of the packet. An action can be defined by the filtering rule and applied when a match occurs. For current TCAMs and packet switch IC filter engines, actions typically include whether to pass the packet, whether to drop the packet, where to forward the packet, and/or other desired action(s) with respect to the packet. For example, additional actions can include adding headers, adding identifiers within headers, stripping headers, stripping identifiers within headers, and/or other additional actions to modify packet contents.

Based upon the applied filter rules 108, the filter engines 109, such as ingress filter engines 206 and egress filter engines 212, direct traffic from the input ports to the output ports. Filter rules can specify a single traffic-matching criterion or they can involve Boolean expressions that logically combine various traffic-matching criteria to represent the desired filtering behavior. Further, the various criteria in the filter may include ranges and/or non-contiguous lists of values which effectively allow for a second level of OR-ing within the filters. In addition, other logic, such as NOT operations, and/or more complicated logic expressions such as source/destination pairs and bidirectional flows could also be represented in filter rules, if desired. A filter's traffic-matching criteria can be configured as desired. For example, matching criteria can be configured to include values in any ISO (International Standards Organization) OSI network layer 2 (L2) through layer 7 (L7) header value or packet content. It is noted that packet-based communications are often discussed in terms of seven communication layers under the OSI model: application layer (L7), presentation layer (L6), session layer (L5), transport layer (L4), network layer (L3), data link layer (L2), and physical layer (L1). Examples of traffic-matching filter criteria for packet-based communications include but are not limited to:

Layer 2 (L2): Source/Destination MAC address, VLAN, Ethertype
Layer 3 (L3): Source/Destination IP address, IP Protocol, Diffserv/TOS
Layer 4 (L4): Source/Destination L4 Port, TCP Control flags It is noted that these L2-L4 criteria are useful because existing hardware designs for packet switch ICs parse these packet headers. However, packet switch devices can be improved by extending filter capabilities to layers 5-7 (L5-L7), and these additional filtering criteria can be used by the NTO 102 as well. Other packet related information and layers could also be used, as desired.

Figure 2B:
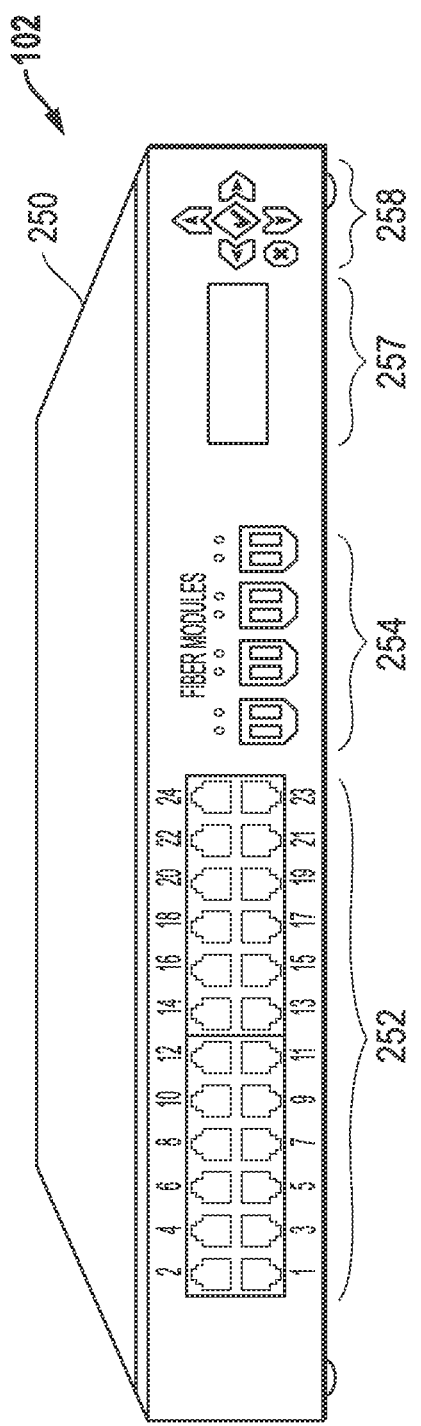
FIG. 2B is a diagram of an example embodiment for external connections for an example network tool optimizer.

FIG. 2B is a diagram of an example embodiment for external connections for an example NTO 102. As depicted, the NTO 102 includes a housing 250 having external connections for a variety of connector types. For example, Ethernet port connectors 252 can be provided (e.g., Ethernet ports 1-24), and fiber optic connectors 254 can be provided for fiber modules. Further, a display screen, such a back-lit LCD screen 257, can also be included for displaying information related to the NTO 102. Direct navigation controls 258 can also be included, for example, for navigating management menus displayed in screen 257. Although not shown, a separate management network port can also be provided, for example, on the back of housing 250. This management network port can provide the control and management interface to control panel 104 for the NTO 102.

It is further noted that circuitry for the NTO 102, including PCBs and power supply circuitry, can be mounted within the housing 250.

Figure 3:
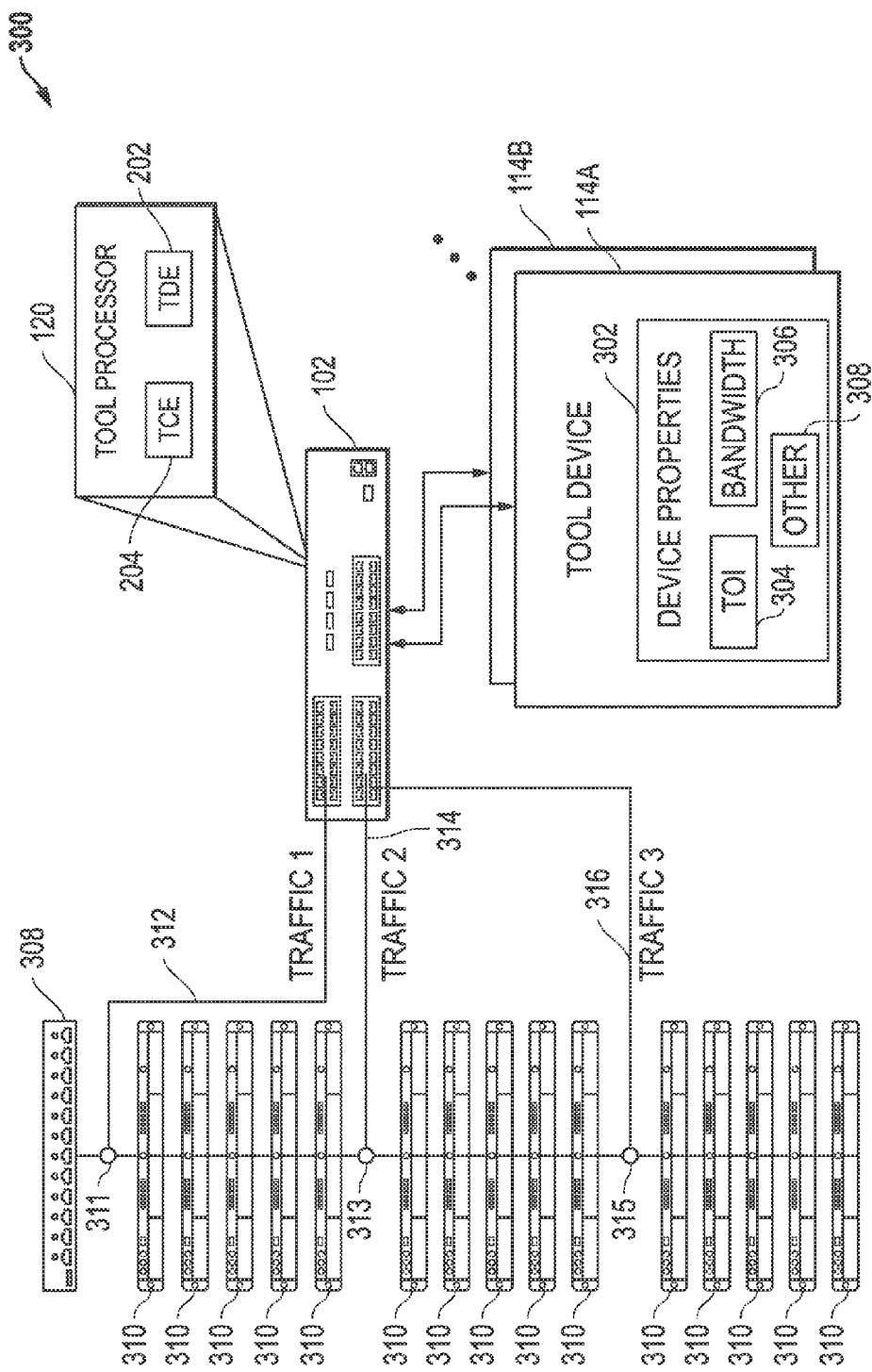
FIG. 3 is a system diagram of an embodiment for a network monitoring system including three network traffic sources connected to a network tool optimizer.

FIG. 3 is a system diagram of an embodiment 300 for a network monitoring system including three network traffic sources connected to an NTO 102. In the example embodiment 300 depicted, a number of different processing system platforms 310, such as blade servers, are connected within a packet-based communication network with each other through a network switch 308. A first TAP 311 provides first network traffic (TRAFFIC 1) 312 to a first input port for the NTO 102. A second TAP 313 provides second network traffic (TRAFFIC 2) 314 to a second input port for the NTO 102. And a third TAP 315 provides third network traffic (TRAFFIC 3) 316 to a third input port for the NTO 102. As described herein, the NTO 102 includes a tool processor 120 that further includes a tool discovery engine (TDE) 202 and a tool configuration engine (TCE) 204. One or more tool devices 114A, 114B . . . can be connected to output ports for the NTO 102. It is again noted that these output ports can be bi-directional to allow the tool devices 114A, 114B . . . to communicate to the NTO 102, for example, through an API and/or through some other handshake protocol. Each tool device has device properties 302, such as for example, bandwidth limitations 306, traffic-of-interest (TOI) 304, and/or other tool information related to its operation and/or functionality. For example, some tool devices are designed to monitor email traffic, while others are designed to monitor voice traffic, internet traffic, and/or other traffic types or combinations of traffic types.

When a tool device, such as tool device 114A, is connected to the NTO 102, the tool discovery engine (TDE) 202 determines relevant traffic information about the tool device. For example, when a new connection to an interface port for the NTO 102 is detected, tool device discovery is then conducted. As one example, LLDP (link layer discovery protocol) or a similar protocol can be used to learn that a tool device has been connected directly to a connection port for the NTO 102. Other protocols could also be used for this discovery process. Once a tool device is identified as being connected, the network traffic to be forwarded to the connection port can be configured using the discovered information for the tool device. As described herein, a variety of techniques can be used to obtain tool related information about the connected tool devices, and this tool information can include the TOI for the tool device, bandwidth limitations, and/or other operational information. For example, a tool properties database 206 stored in a data storage system within the NTO 102 can be used to provide relevant traffic and other operational information about known tool devices. As such, once the type of tool device is determined by discovery upon its connection to a port for the NTO 102, the tool properties database 206 can be used to obtain information about this tool device if it is a known device type and data for that device type has previously been stored in the tool properties database 206. Further, the NTO 102 can provide an API that can be used by the tool device to update and/or provide operational information about itself to the NTO 102. Still further, a user can manually provide, update, or add operational information about a tool device to the tool properties database 206, for example, through the management platforms 116A, 116B . . . 116C. Other techniques for providing tool information can also be utilized.

With respect to allowing connected tool devices to communicate with the NTO 102 through an API, the following provides an example traffic feed declaration that could be used by a tool device. For this example, a tool device is indicating a maximum bandwidth for the tool device, that voice and email traffic should be given top priority, that instant messenger traffic should be given second priority, and that RTP (real-time transit protocol) streams and RTSP (real-time streaming protocol) streams should be given lowest priority. Other traffic is not within the TOI for the tool device and need not be forwarded to the tool device.

```
Name: Traffic Filter
MaxBandwidth: 10Gbps
Traffic: [{
    Name: Voice
    Priority: 1
    Filter: [
        Protocol TCP Port 5060,
        Protocol UDP Port 5004
    ]
},{
    Name: Email
    Priority: 1
    Filter: [
        Protocol TCP Port 25
    ]
},{
    Name: Instant Messenger
    Priority: 2
    Filter: [
        ...
    ]
},{
    Name: RTP / RTSP
    Priority: 3
    Filter: [
        Protocol UDP Ports
        16348-32768
    ]
}]
```

It is noted that the above example traffic feed declaration represents only one example and other declaration techniques could also be used where an NTO 102 is configured to provide an API through which the tool device can communicate relevant traffic and/or other operational information.

After determining operation information about the tool device, the tool processor 120 for the NTO 102 can automatically generate new filters and related packet forwarding rules to provide relevant network traffic to the new tool device. Further, the NTO 102 can also provide suggestions to users of the NTO 102 with respect to relevant traffic that the user may want sent to the new tool device. The control panel 104 and the management platforms 116A, 116B . . . 116C can be used to allow users to view, manage, and control the filters that are applied between the network traffic sources and the destination tool devices, as well as to provide messages to the users with respect to the automated tool discovery and configuration being performed by the filter processor 106 within the NTO 102.

With respect to traffic feed suggestions, the NTO 102 can be configured to analyze its existing network traffic to determine if input network traffic include relevant traffic for network tool devices connected to the NTO 102. For example, filters can be applied to input network traffic to determine information about the network traffic. Further, these filters can be implemented as hidden filters that are not visible to users. A hidden filter refers to a filter that is used for internal operations of the NTO 102 and that is not shown to users through the management platforms 116A, 116B . . . 116C. As such, the filter remains hidden to the users of the NTO 102. Even though hidden to users, the NTO 102 can still collect information associated with the hidden filter such as statistics concerning packets that match the filter rules. Further, these hidden filters can be configured to drop all packets so that no packets are forwarded to output ports for the NTO 102. In this way, the NTO 102 can be configured to be aware of the traffic types that are present in the network traffic sources without increasing the number packets actually sent out output ports for the NTO 102. In addition, statistics can also be gathered from these user visible filters, as well. Other variations could also be implemented while still collecting information concerning the network being received by the NTO 10 for purposes of the automated tool discovery and configuration techniques described herein.

Using information gathered by the NTO 102 about the network traffic it is receiving, the NTO 102 can provide traffic feed suggestions to the users once the operational information about the newly connected tool device has been determined. Further, when new network traffic sources are connected to the NTO 102, the NTO 102 can determine the traffic type for each new traffic source and make traffic feed suggestions for previously connected tool devices for which operational information is known. Other variations could also be implemented while still taking advantage of the automated tool discovery and configuration techniques described herein.

For certain embodiments, a hidden filter is configured for each tool device attached to the NTO 102 that includes the traffic of interest (TOI) for that tool device. This hidden filter can then be associated with each input port that is receiving network traffic. If the output for a hidden filter becomes non-zero, then it is known that traffic is being received that is relevant to the TOI for the tool device associated with the hidden filter. When this non-zero event occurs, a message can be communicated to the user, for example using the management platforms 116A, 116B . . . 116C, that relevant traffic is being received and that this traffic is available to be routed to the tool device. Further, the NTO 102 can be configured to automatically route any such identified relevant traffic without requiring user intervention. Other variations could also be implemented while still taking advantage of the automated tool discovery and configuration techniques described herein.

It is further noted that the TOI for a given tool device can be updated or otherwise modified during operation of the NTO 102 and/or the tool device. For example, the tool device can update its traffic feed characteristics at any time during its operation such as when it needs to adjust bandwidth of incoming traffic in order to handle overload conditions. Further, the tool device may want to adjust its TOI based upon events detected within the traffic it is receiving. For example, if a security monitoring tool detects a network breach or intrusion, the security monitoring tool may want to adjust its TOI to collect additional and/or different network traffic related to this network breach or intrusion. Other variations could also be implemented while still taking advantage of the automated tool discovery and configuration techniques described herein.

It is also note that the tool properties database 206 can store any desired information about tool devices and/or other devices that may potentially be connected to the NTO 102. Further, relevant traffic information and/or other operational information for any new devices that are connected to the NTO 102 can be stored in the tool properties database 206 for future use by the NTO 102. It is further noted that the NTO 102 can be configured to periodically communicate with a central database of tool properties to provide updates to its own internal tool properties database 206 and/or to update data within the central database with tool properties information gather in the field operations for the NTO 102. In this way, accurate local and/or centralized databases can be built that include information for tool devices and/or other devices that are being used with one or more NTOs having the automated tool discovery and configuration techniques described herein. As such, up-to-date information can be stored concerning communication protocols, filter definitions that describe these protocols, traffic relevant for various tools, bandwidth limitations for tool devices, and/or other tool related information. Other variations could also be implemented while still taking advantage of the automated tool discovery and configuration techniques described herein.

Figure 4:
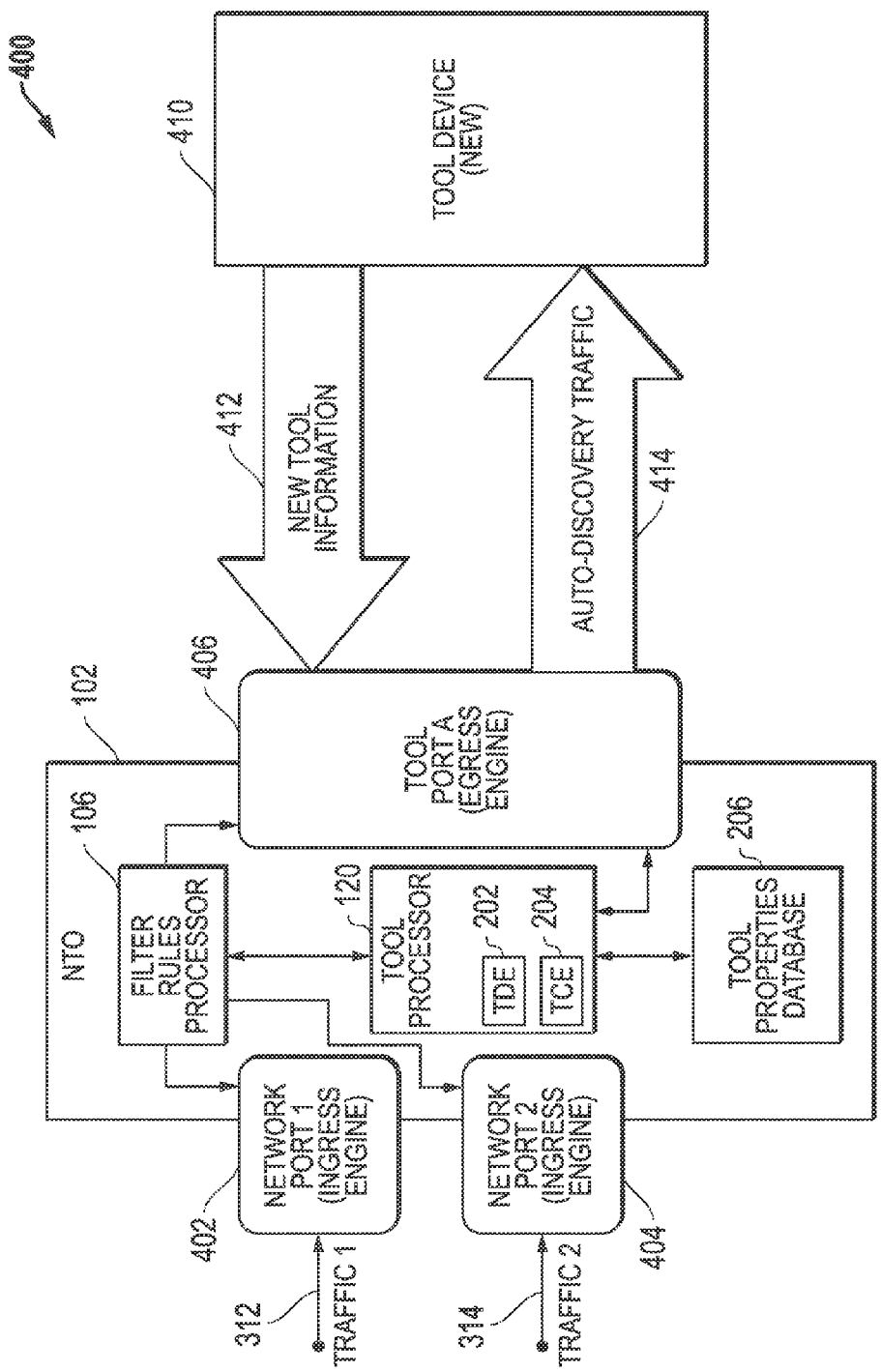
FIG. 4 is a block diagram of an example embodiment where a new tool device is connected to a network tool optimizer and auto-discovered traffic is forwarded to the new tool device.
Figure 5:
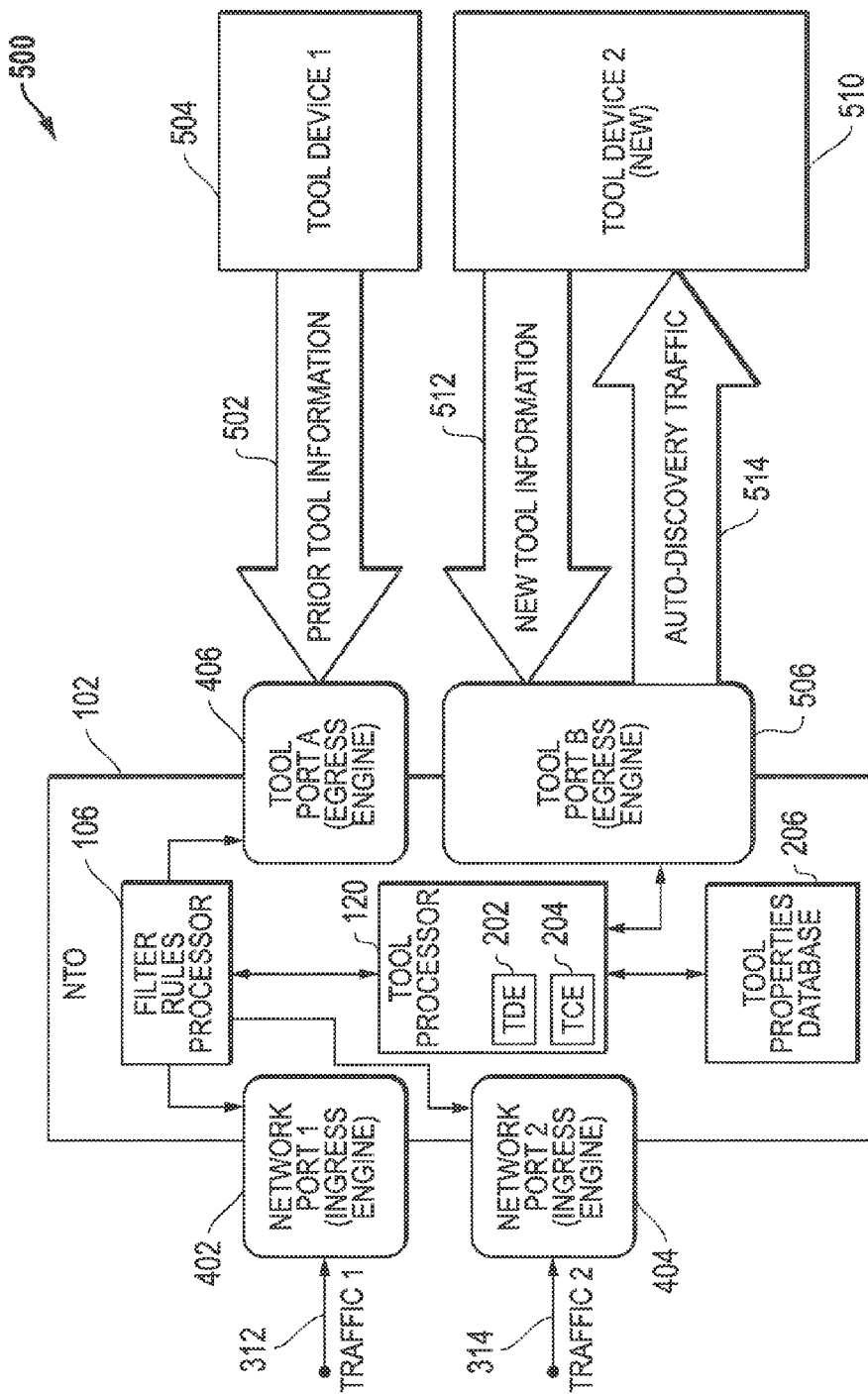
FIG. 5 is a block diagram of an example embodiment where a new tool device is connected to a network tool optimizer and prior tool information for a previously connected tool device is used to configure network traffic for the newly connected tool device.
Figure 6:
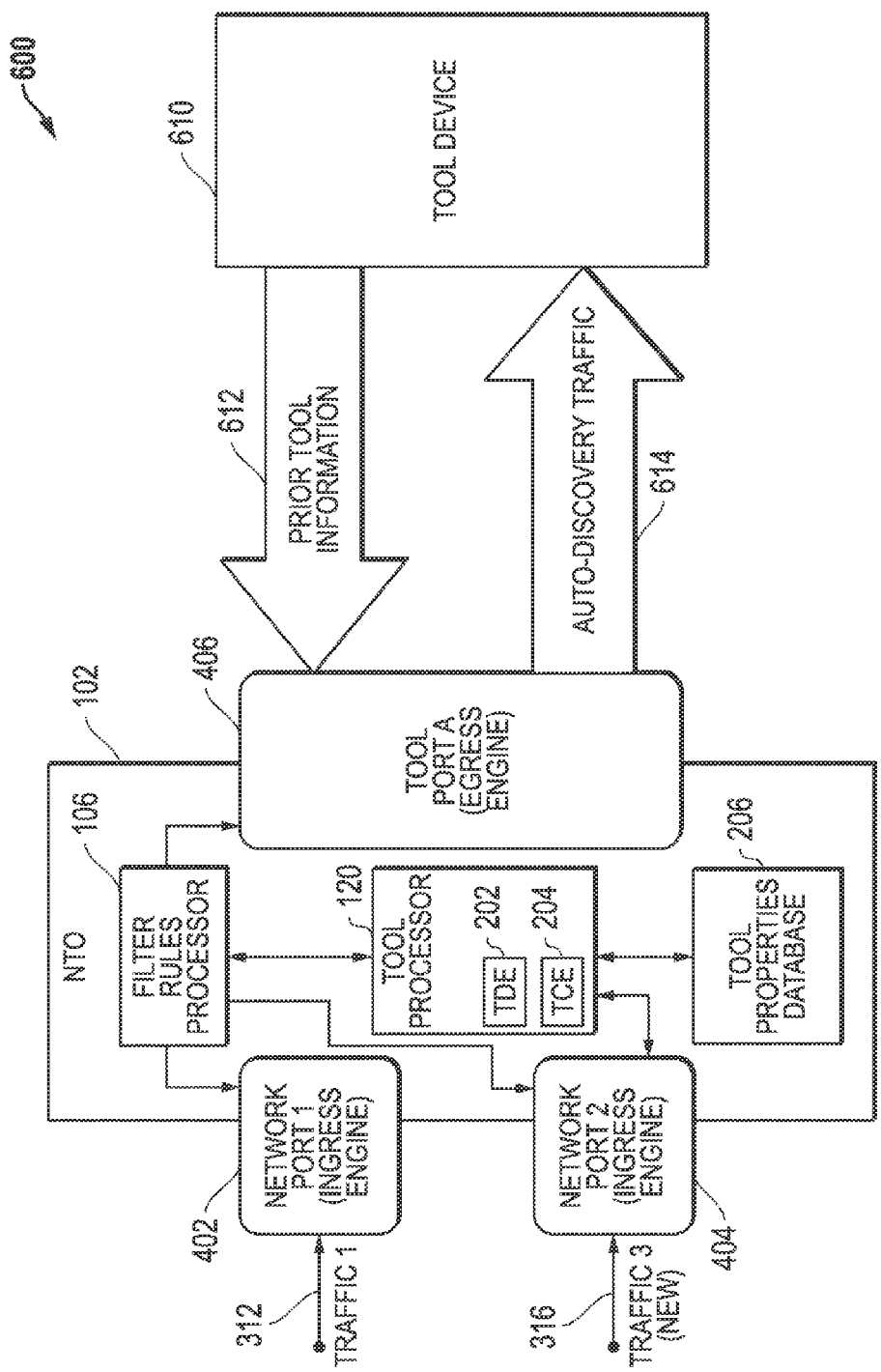
FIG. 6 is a block diagram of an example embodiment where relevant network traffic from a new network source connected to a network tool optimizer is automatically identified for a previously connected tool device.

Example embodiments for using the tool processor 120 within the NTO 102 to provided automatic discovery and configuration of one or more network tool devices that are connected to the NTO 102 or being connected to the NTO 102 are now described further with respect to FIGS. 4-6. Other usage embodiments could also be implemented while still taking advantage of the automated tool discovery and configuration techniques described herein.

FIG. 4 is a block diagram of an example embodiment 400 where a new tool device 410 is connected to the NTO 102. As described above, the NTO 102 in part includes a filter rules processor 106 and a tool processor 102 that further includes a tool discovery engine (TDE) 202 and a tool configuration engine (TCE) 204. The NTO 102 can also include a tool properties database 206 that stores information about known tool devices. Example embodiment 400 also includes two network input ports 402 and 404 and one tool output port 406. An ingress engine is associated with each of the network input ports 402/404, and an egress engine is associated with the tool output port 406. Further, for the example embodiment 400, the NTO 102 is already connected to receive first network traffic (TRAFFIC1) 312 at the first network input port (NETWORK PORT 1) 402 and to receive second network traffic (TRAFFIC 2) 314 at the second network input port (NETWORK PORT 2) 404. A new tool device 410 is also being connected to a tool port (TOOL PORT A) 406 for the NTO 102.

In operation, when the new tool device 410 is connected to the NTO 102 through the tool output port 406, automatic tool discovery is initiated through the tool discovery engine 202. New tool information 412 is then acquired by the tool processor 120 using one or more techniques, as described herein. This new tool information 412 is then used by the tool configuration engine 204 to automatically generate and/or suggest one or more new filters for the filter processor 106 that will forward relevant network traffic from network traffic sources 312/314 to the newly connected tool device 410. As described herein, tool information stored in the tool properties database 206 can also be used by the tool configuration engine 204 to identify relevant traffic and to generate the new filters to forward this relevant traffic to the newly connected tool device 410. The filter rules processor 106 automatically generates forwarding rules 110 associated with these new filters and applies these forwarding rules to filter engines, such as the ingress engines associated with the network ports 402/404 and the egress engine associated with the tool port 406, so that relevant traffic from the network traffic 312/314 is forwarded to the new tool device 410 within the NTO 102. This relevant traffic from the network traffic 312/314 is represented by the auto-discovery traffic 414 shown as communicated from tool port 406 to the new tool device 410.

After generating the filter engine rules associated with one or more new automatically generated filters, the filter rules processor 106 applies these new rules to the filter engines 109, such a ingress filter engines 206 and egress filter engines 212 in FIG. 2A. The priority of execution for these rules can also be set, for example, by placing the high priority rules to be executed first within a given filter engine, such as an ingress filter engine. In addition, priority of execution can be set by placing higher priority rules in ingress engines and lower priority rules in egress engines that receive packets according to the forwarding actions set forth in the ingress engines. For example, an ingress engine associated with an input port can forward all traffic from a particular source identifier to an egress engine associated with an output port, and the egress engine can drop any non-desired traffic before allowing desired traffic to be output through the output port.

The following tables represent example rules that can be set up in ingress and egress filter engines to handle a monitoring example where only email traffic (Port 25) is desired from a particular range of source identifiers for a newly connected tool device 410 as shown in FIG. 4. The first table provides example ingress filter engine rules to forward all user traffic within the selected range of source port (SP) addresses to the tool output port for the tool device. User traffic outside the selected range is dropped. The second table provides example egress filter engine rules that allows only email traffic (Port 25) to be passed to the monitoring tool device. All other packets are to be dropped. It is noted that an ingress filter engine is associated with each input port, and an egress engine is associated with the output port for the tool device.

Example Ingress/Egress Forwarding Rules for New Connected Tool Device

| Ingress Filter Engine - Each Input Port (InputPorts1-2) | |
|---|---|
| Filter Value | Forwarding Action |
| SP-Range | OutputPort1 |
| * | DROP |

| Egress Filter Engine - OutputPort1 | |
|---|---|
| Filter Value | Forwarding Action |
| Port 25 | PASS |
| * | DROP |

For the tables above, it is assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. InputPorts1-2 represent the network input ports 402 and 404 in FIG. 4. OutputPort1 represents the tool output port 406 in FIG. 4 that is connected to the new tool device 410. It is also noted that a "*" designation indicates that all values match the criteria, that a PASS designation indicates that packets matching the filter value are passed along, and that a DROP designation indicates that packets matching the filter values are discarded. It is further noted that the tables above represent a simplified example for the purpose of explaining the automatic filter and related filter rules generation and application. Actual implementations would likely provide more complex filter selections and associated rules to provide more sophisticated packet forwarding from input traffic sources to destination tool devices.

FIG. 5 is a block diagram of an example embodiment 500 where a new tool device (TOOL DEVICE 2) 510 is connected to the NTO 102 and prior tool information 502 for a previously connected tool device (TOOL DEVIDE 1) 504 is used to configure the new tool device 510. As described above, the NTO 102 in part includes a filter rules processor 106 and a tool processor 102 that in turn includes a tool discovery engine (TDE) 202 and a tool configuration engine (TCE) 204. The NTO 102 can also include a tool properties database 206 that stores information about known tool devices. Example embodiment 500 also includes two network ports 402 and 404 and two tool output ports 406/506. An ingress engine is associated with each of the network ports 402/404, and an egress engine is associated with each of the tool ports 406/506. For the example embodiment 500, the NTO 102 is already connected to receive first network traffic (TRAFFIC1) 312 at the first network input port (NETWORK PORT1) 402 and to receive second network traffic (TRAFFIC2) 314 at the second network input port (NETWORK PORT2) 404. Further, a first tool device 504 is already connected to the first tool output port (TOOL PORT A) 406 for the NTO 102, and prior tool information 502 relating to the first tool device 504 has already been discovered by the tool processor. This prior tool information 502 can be stored, for example, in the tool properties database 206. A second new tool device 510 is also being connected to a second tool port (TOOL PORT B) 506 for the NTO 102.

In operation, when the new tool device 510 is connected to the NTO 102 through the tool output port 506, automatic tool discovery is initiated through the tool discovery engine 202. New tool information 512 is then acquired by the tool processor 120 using one or more techniques, as described herein. This new tool information 512 is then used by the tool configuration engine 204 to automatically generate and/or suggest one or more new filters for the filter processor 106 that will forward relevant traffic from the network traffic 312/314 to the new tool device 512. As described herein, tool information stored in the tool properties database 206, such as prior tool information 502, can be used by the tool configuration engine 204 to generate the new filters. As such, to the extent that configurations for the first tool device 504 are relevant to the second tool device 510, for example where the first and second tool devices 504/510 are the same type of tool device and/or have the same TOIs, the tool processor 120 uses the prior tool information 502 and prior configuration settings for the first tool device 504 to configure the second tool device 510. For example, filters defined for the first tool device 504 within the filter rules processor 106 can be copied and also defined for the second tool device 510. In particular, the prior tool information 502 can be used by the tool configuration engine 204 to automatically generate and/or suggest one or more new filters that will forward relevant traffic from the network traffic 312/314 to the new tool device 510. As described above, the filter rules processor 106 automatically generates forwarding rules associated with the new filters and applies these forwarding rules to filter engines within the NTO 102, such as the ingress engines associated with the network ports 402/404 and the egress engines associated with the tool ports 406/506, so that the relevant traffic from the network traffic 312/314 is forwarded to the new tool device 510. This relevant traffic from the network traffic 312/314 is represented by the auto-discovery traffic 514 shown as communicated from tool port 506 to the new tool device 510.

After generating the filter engine rules associated with one or more new automatically generated filters, the filter rules processor 106 applies these new rules to the filter engines 109, such a ingress filter engines 206 and egress filter engines 212 in FIG. 2A. The priority of execution for these rules can also be set, for example, by placing the high priority rules to be executed first within a given filter engine, such as an ingress filter engine. In addition, priority of execution can be set by placing higher priority rules in ingress engines and lower priority rules in egress engines that receive packets according to the forwarding actions set forth in the ingress engines. For example, an ingress engine associated with an input port can forward all traffic from a particular source identifier to an egress engine associated with an output port, and the egress engine can drop any non-desired traffic before allowing desired traffic to be output through the output port.

The following tables represent example rules that can be set up in ingress and egress filter engines to handle a monitoring example where filter rules applied for a previously connected tool device 504 are used to generate new filter rules for the newly connected tool device 510 as shown in FIG. 5. The first table below provides example ingress filter engine rules to forward all user traffic within a selected range of source port (SP) addresses to the previously connected tool device and now to the newly connected tool device as well. User traffic outside the selected range is dropped. The second table provides example egress filter engine rules that allows only email traffic (Port 25) to be passed to the previously connected tool device and the newly connected tool device. All other packets are to be dropped. It is noted that an ingress filter engine is associated with each input port, and an egress engine is associated with the output port for the tool device.

Example Ingress/Egress Rules for Additional New Tool Device Similar to Prior Tool Device

| Ingress Filter Engine - Each Input Port (InputPorts1-2) | |
|---|---|
| Filter Value | Forwarding Action |
| SP-Range | OutputPort1, OutputPort2 [COPIED] |
| * | DROP |

| Egress Filter Engine - OutputPort1 | |
|---|---|
| Filter Value | Forwarding Action |
| Port 25 | PASS |
| * | DROP |

| Egress Filter Engine - OutputPort2 [COPIED] | |
|---|---|
| Filter Value | Forwarding Action |
| Port 25 | PASS |
| * | DROP |

For the tables above, the "COPIED" designation represents filter rules that are based upon a filter that was copied from the previously connected tool device for the newly connected tool device. It is also again assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. InputPorts1-2 represent the input ports 402 and 404. OutputPort1 represents the output port 406 connected to the previously connected tool device 504. OutputPort2 represents the output port 506 connected to new tool device 410. It is also noted that a "*" designation indicates that all values match the criteria, that a PASS designation indicates that packets matching the filter value are passed along, and that a DROP designation indicates that packets matching the filter values are discarded. It is further noted that the tables above represent a simplified example for the purpose of explaining the automatic filter and related filter rules generation and application. Actual implementations would likely provide more complex filter selections and associated rules to provide more sophisticated packet forwarding from input traffic sources to destination tool devices.

FIG. 6 is a block diagram of an example embodiment 600 where new network traffic (TRAFFIC 3) 316 from a new network source connected to the NTO 102 is automatically analyzed for relevance to a tool device (TOOL DEVICE 1) 610 previously connected to the NTO 102. Prior tool information 612 has already been determined by the tool discovery engine 202 for the previously connected tool device (TOOL DEVIDE 1) 610. This prior tool information 612, for example, can be stored in the tool properties database 206. As described above, the NTO 102 in part includes a filter rules processor 106 and a tool processor 102 that in turn includes a tool discovery engine (TDE) 202 and a tool configuration engine (TCE) 204. The NTO 102 can also include a tool properties database 206 that stores information about known tool devices. Example embodiment 600 also includes two network input ports 402 and 404 and one tool output port 406. An ingress engine is associated with each of the network ports 402/404, and an egress engine is associated with the tool ports 406. For the example embodiment 500, the NTO 102 is already connected to receive first network traffic (TRAFFIC1) 312 at the first network port (NETWORK PORT1) 402, and a tool device 610 is already connected to the tool output port (TOOL PORT A) 406 for the NTO 102. New network traffic (TRAFFIC 3) 316 is now being connected to the second network port (NETWORK PORT2) 406 for the NTO 102.

In operation, when the new network traffic 316 is connected to the NTO 102 through the network input port 404, automatic discovery is initiated through the tool discovery engine 202. The new network traffic 316 is analyzed to determine if it is relevant to any filters and/or TOIs previously defined and/or stored for the previously connected tool device 610. If traffic within the new network traffic 316 is determined to be relevant to the previously connected tool device 610, the tool configuration engine 204 automatically generates and/or suggests one or more new filters for the filter processor 106 that will forward this relevant traffic from the new network traffic 316 to the previously connected tool device 610. As described herein, prior tool information 612 for the previously connected tool 610 can be used by the tool configuration engine 204 to generate the new filters. For example, filters defined for the first network traffic 312 within the filter rules processor 106 can be copied and defined for similar network traffic within the new network traffic 316. As such, the prior tool information 612 and related configurations are used by the tool configuration engine 204 to automatically generate and/or suggest one or more new filters for the filter processor 106 that will forward relevant traffic from the new network traffic 316 to the previously connected tool device 610. As described above, the filter rules processor 106 automatically generates forwarding rules associated with the new filters and applies these forwarding rules to filter engines within the NTO 102, such as the ingress engines associated with the network input ports 402/404 and the egress engine associated with the tool output port 406, so that the relevant traffic from the new network traffic 316 is forwarded to the previously connected tool device 610. This relevant traffic within the network traffic 316 is represented by the auto-discovery traffic 614 shown as communicated from tool output port 406 to the tool device 610.

After generating the filter engine rules associated with one or more new automatically generated filters, the filter rules processor 106 applies these new rules to the filter engines 109, such a ingress filter engines 206 and egress filter engines 212 in FIG. 2A. The priority of execution for these rules can also be set, for example, by placing the high priority rules to be executed first within a given filter engine, such as an ingress filter engine. In addition, priority of execution can be set by placing higher priority rules in ingress engines and lower priority rules in egress engines that receive packets according to the forwarding actions set forth in the ingress engines. For example, an ingress engine associated with an input port can forward all traffic from a particular source identifier to an egress engine associated with an output port, and the egress engine can drop any non-desired traffic before allowing desired traffic to be output through the output port.

The following tables represent example rules that can be set up in ingress and egress filter engines to handle a monitoring example where filter rules are applied to send relevant traffic from a newly connected traffic source to the previously connected tool device 610 as shown in FIG. 6. The first table below provides example ingress filter engine rules to forward all user traffic within a selected range of source port (SP) addresses from the previously connected source and from the newly connected source to the previously connected tool device. User traffic outside the selected range is dropped. The second table provides example egress filter engine rules that allows only email traffic (Port 25) to be passed to the previously connected tool device. All other packets are to be dropped. It is noted that an ingress filter engine is associated with each input port, and an egress engine is associated with the output port for the tool device.

Example Tables Ingress/Egress Rules for New
Network Traffic Source to Previous Tool Device

| Ingress Filter Engine - InputPorts1 | |
|---|---|
| Filter Value | Forwarding Action |
| SP-Range | OutputPort1 |
| * | DROP |

| Ingress Filter Engine - InputPorts2 [COPIED] | |
| --- | --- |
| Filter Value | Forwarding Action |
| SP-Range | OutputPort1 |
| * | DROP |

| Egress Filter Engine - OutputPort1 | |
| --- | --- |
| Filter Value | Forwarding Action |
| Port 25 | PASS |
| * | DROP |

For the tables above, the "COPIED" designation represents filter rules that were copied from a filter that was already defined with respect to the previously connected traffic source for the previously connected tool device. For the tables above, it is again assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. InputPort1 represents the network input port 402 having the original network traffic (TRAFFIC1) 312, and InputPort2 represents the network input port 404 that new receives the new network traffic (TRAFFIC3) 316. OutputPort1 represents the tool output port 406 connected to the previously connected tool device 610. It is also noted that a "*" designation indicates that all values match the criteria, that a PASS designation indicates that packets matching the filter value are passed along, and that a DROP designation indicates that packets matching the filter values are discarded. It is further noted that the tables above represent a simplified example for the purpose of explaining the automatic filter and related filter rules generation and application. Actual implementations would likely provide more complex filter selections and associated rules to provide more sophisticated packet forwarding from input traffic sources to destination tool devices.

Figure 7:
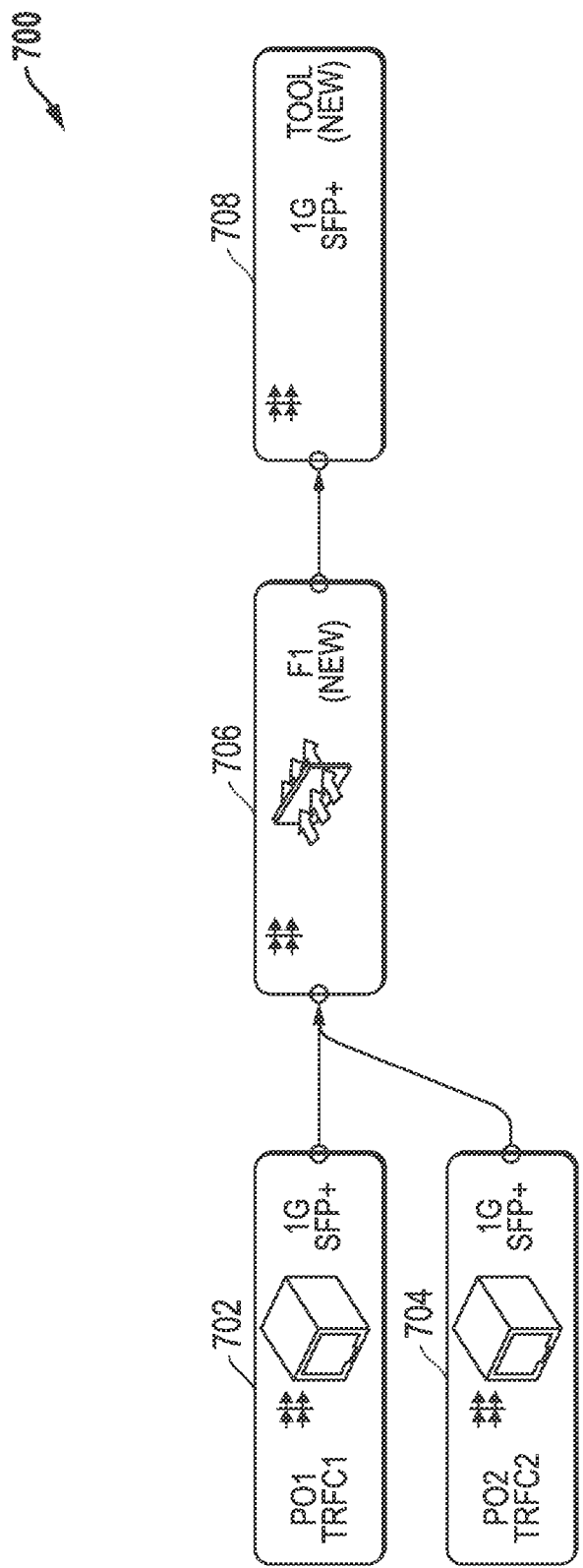
FIG. 7 is an example embodiment for graphical user interface (GUI) that displays an automatically generated filter to a user of the network tool optimizer.
Figure 8:
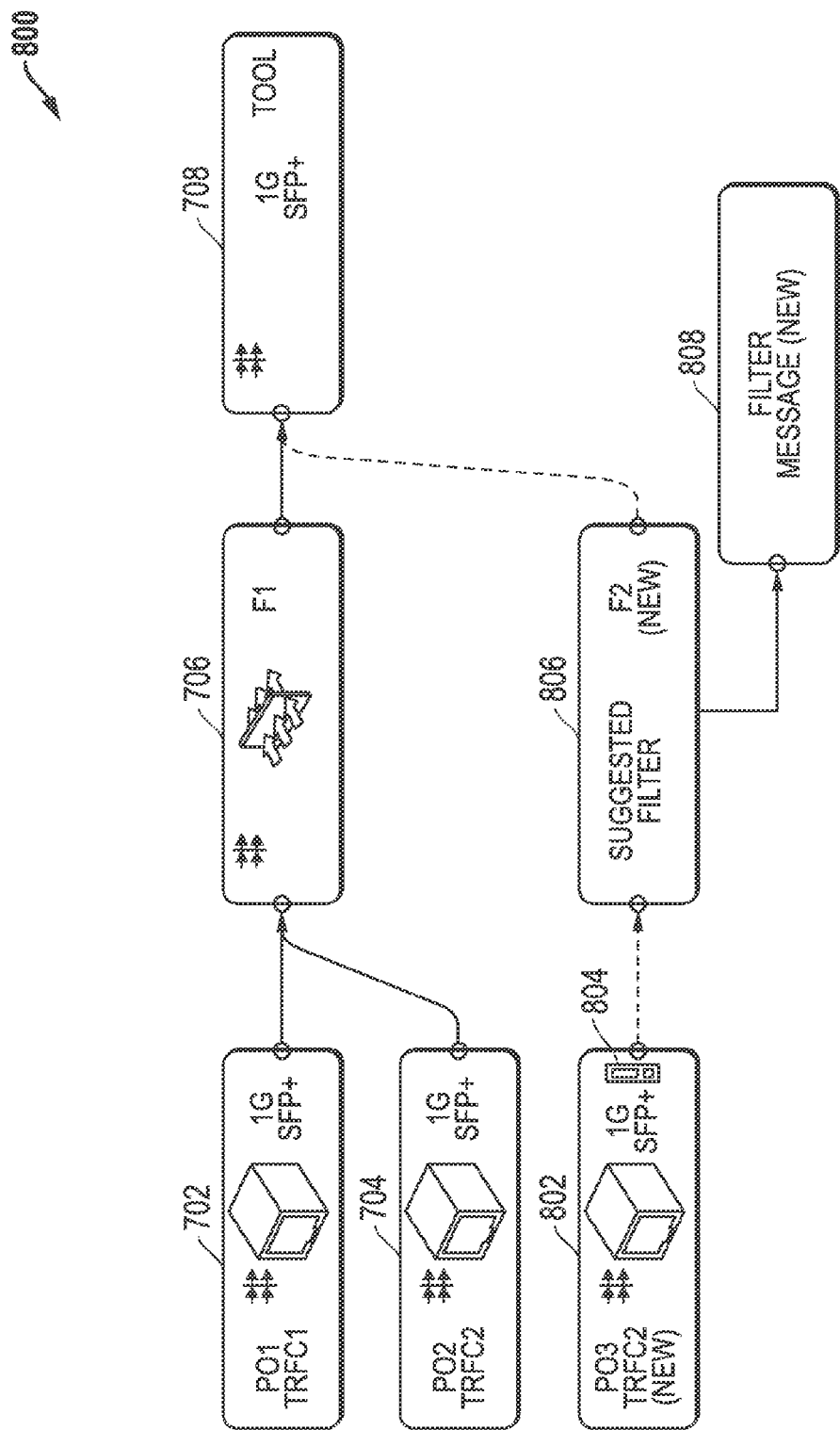
FIG. 8 is an example embodiment for graphical user interface (GUI) that displays an automatically suggested filter to a user of the network tool optimizer.

Example embodiments for a graphical user interface (GUI) for displaying filters 108 to users of the NTO 102, such as through the management platforms 116A-C, are now described further with respect to FIGS. 7-8. Other user interface embodiments could also be implemented while still taking advantage of the automated tool discovery and configuration techniques described herein.

FIG. 7 is an example embodiment 700 for graphical user interface (GUI) that displays an automatically generated filter 706 to a user of the NTO 102, for example, through the management interface(s) 116A, 116B . . . 116C. In part, the user can access and use this GUI 700 to view, manage, and configure filters 108 so that the input traffic is forwarded to tool devices as desired by the user. However, as described herein, the GUI 700 is also used to display filters that are automatically generated by the tool processor 120. For the embodiment depicted, a filter (F1) 706 has been automatically generated that receives packets from a first input port (P01) 702 associated with first network traffic (TRFC1) and from a second input port (P02) 704 associated with second traffic (TRFC2). The filter 706 filters this traffic and forwards portions of this traffic from network input ports 702/704 to a tool output port 708 associated with new tool device connected to the NTO 102. It is noted that the network input ports 702/704 and the tool output ports 708 can represent, for example, one gigabyte per second (1 G) fiber optic connections (e.g., SFP+ connections). It is also noted that other graphical depictions and variations could also be used, as desired, while still displaying an automatically generated filter 706. As described above, the filter rules processor 106 automatically generates forwarding rules associated with the new filter 706 and applies these forwarding rules to the filter engines 109 associated with the ingress ports 702/704 and/or the egress port 708 so that relevant traffic from the network traffic sources (TRFC1, TRFC2) is forwarded from ingress ports 702/704 to the egress port 708 for the newly connected tool device.

FIG. 8 is an example embodiment 800 for graphical user interface (GUI) that displays an automatically suggested filter 806 to a user of the NTO 102, for example, through the management interface(s) 116A, 116B . . . 116C. In part, the user can access and use this GUI 800 to view, manage, and configure the filters 108 so that the input traffic is forwarded to tool devices as desired by the user. However, as described herein, the GUI 800 is also used to display filters that are automatically suggested by the tool processor 120. For the embodiment depicted, a filter (F1) 706 has previously been defined that receives packets from a first input port (P01) 702 associated with first network traffic (TRFC1) and from a second input port (P02) 704 associated with second traffic (TRFC2). The filter 706 filters this traffic and forwards selected portions of this traffic from network input ports 702/704 to a tool output port 708 associated with a tool device that was previously connected to the NTO 102. New third traffic (TRFC3) is being connected to the NTO 102 and is associated with a third input port (P03) 802. A new filter (F2) 806 has been automatically generated by the tool processor 120 that is configured to forward relevant traffic from the new traffic (TRFC3) received at input port 802 to the tool port 708 for the previously connected tool device.

For example embodiment 800, this new filter (F2) 806 is being suggested for use, and dashed lines are used to connect the automatically generated and suggested filter (F2) 806 between network input port 802 and tool output port 708. A symbol 804 such as an exclamation point can also be used to draw the user's attention to the new traffic connection to network port 802. Further, a message 808 can be displayed and/or otherwise communicated to the user that asks the user to confirm whether or not the automatically suggested filter (F2) 806 should be applied. If the user confirms application of the filter 806, then is defined and the dashed lines can be changed to solid lines. If the user chooses not to apply the filter 806, then the filter 806 and the dashed lines can be removed from the GUI 800.

It is noted that the network ports 702/704/802 and the tool ports 708 can represent, for example, one gigabyte per second (1 G) fiber optic connections (e.g., SFP+ connections). It is also noted that other graphical depictions and variations could also be used, as desired, while still displaying an automatically generated and suggested filter 806. As described above, once the user confirms application of the suggested filter, the filter rules processor 106 automatically generates forwarding rules for the suggested filter 806 and applies these forwarding rules to the filter engines 109 associated with the ingress port 802 and/or the egress port 708 so that relevant traffic from the new network traffic (TRFC3) is forwarded from ingress port 802 to egress port 708 for the tool device.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, configurable logic devices can be used such as CPLDs (complex programmable logic devices), FPGAs (field programmable gate arrays), ASIC (application specific integrated circuit), and/or other configurable logic devices. In addition, one or more processors and/or other processing devices running software or firmware could also be used, as desired. For example, computer readable instructions embodied in a non-transitory tangible storage medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, processors, programmable circuitry (e.g., FPGAs, CPLDs), and/or other processing devices to perform the processes, functions, and capabilities described herein. It is further understood, therefore, that one or more of the tasks, functions, or methodologies described herein may be implemented, for example, as software or firmware and/or other instructions embodied in one or more non-transitory tangible computer-readable mediums that are executed by a CPU (central processing unit), controller, microcontroller, processor, microprocessor, FPGA, CPLD, ASIC, or other suitable processing device or combination of such processing devices. It is further noted that the data storage systems described herein can be any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for operating a network tool optimizer (NTO) device having one or more input ports, one or more output ports, one or more filter engines, and a tool processor coupled to the one or more output ports, comprising:

communicating, with the tool processor, through the one or more output ports with a newly connected network tool device to receive tool information from the newly connected network tool device after it is connected to the one or more output ports for the network tool optimizer (NTO) device;

automatically discovering, with the tool processor, relevant traffic information for the newly connected network tool device based upon the tool information received from the newly connected network tool device;

automatically generating, with the tool processor, packet forwarding rules for the one or more filter engines for the NTO device based upon the relevant traffic information discovered for the newly connected network tool device, the packet forwarding rules being configured to forward relevant network traffic to the newly connected network tool device;

applying the packet forwarding rules to the one or more filter engines;

receiving network input traffic at the one or more input ports for the NTO device; and forwarding relevant network traffic from the network input traffic to the newly connected network tool device through the one or more output ports using the one or more filter engines.

2. The method of claim 1, wherein the discovering step comprises automatically obtaining the relevant traffic information from a database stored within a data storage medium for the NTO device based upon the tool information received from the newly connected network tool device.

3. The method of claim 2, wherein the tool information received from the newly connected network tool device comprises tool identification information, and further comprising using the tool identification information to automatically obtain the relevant traffic information from the database.

4. The method of claim 3, further comprising using tool identification information received from a user of the NTO device to automatically obtain additional relevant traffic information from the database.

5. The method of claim 2, further comprising updating the database over time during operation of the NTO device.

6. The method of claim 1, wherein the tool information received from the newly connected network tool device comprises the relevant traffic information.

7. The method of claim 6, further comprising receiving the relevant traffic information from the newly connected network tool device through an application programming interface for the NTO device.

8. The method of claim 6, further comprising storing the relevant traffic information received from the newly connected network tool device within a database stored within a data storage medium for the NTO device.

9. The method of claim 1, further comprising requesting user approval prior to the applying step and conducting the applying step only if user approval is received.

10. The method of claim 9, further comprising requesting user approval by displaying a message to a user through a graphical user interface.

11. The method of claim 1, wherein the discovering step comprises associating the newly connected network tool device with a previously connected network tool device based upon the tool information, automatically obtaining prior relevant traffic information related to the previously connected network tool device, and using this prior relevant traffic information as the relevant traffic information for the newly connected network tool device.

12. The method of claim 1, further comprising receiving new network input traffic at an input port for the NTO device from a newly connected traffic source, analyzing the new network input traffic to determine if it represents new relevant network traffic for a connected network tool device, generating and applying additional packet forwarding rules for the new relevant network traffic based upon the determination, and forwarding the new relevant network traffic from the new network input traffic to the connected network tool device.

13. The method of claim 1, further comprising analyzing packets within current network input traffic to identify packet types within the network input traffic, determining if one or more of the identified packet types represent additional relevant network traffic for the newly connected network tool device, generating and applying additional packet forwarding rules for the additional relevant network traffic based upon the determination, and forwarding the additional relevant network traffic from the network input traffic to the newly connected network tool device.

14. The method of claim 1, further comprising obtaining additional relevant traffic information from a user of the NTO device.

15. The method of claim 1, wherein the applying step comprises automatically applying the packet forwarding rules without user approval based upon the relevant traffic information.

16. A network tool optimizer (NTO) device, comprising:
one or more input ports;
one or more output ports;
packet forwarding circuitry configured to forward network packets from the input ports to the output ports;
one or more filter engines configured to control at least in part how the packet forwarding circuitry forwards packets between input ports and output ports; and
a tool processor comprising;
a tool discovery engine coupled to the output ports and configured to communicate through the one or more output ports with a newly connected network tool device to receive tool information from the newly connected network tool device after it is connected to the one or more output ports, and to automatically discover relevant traffic information for the newly connected network tool device based upon the tool information received from the newly connected network tool device; and
a tool configuration engine coupled to the one or more filter engines and configured to automatically generate packet forwarding rules for the one or more filter engines based upon the relevant traffic information discovered for the newly connected network tool device and to apply the packet forwarding rules to the one or more filter engines, the packet forwarding rules being configured to forward relevant network traffic to the newly connected network tool device.

17. The network tool optimizer device of claim 16, further comprising a data storage medium, and wherein the tool discovery engine is further configured to automatically obtain the relevant traffic information from a database stored within the data storage medium based upon the tool information received from the newly connected network tool device.

18. The network tool optimizer device of claim 17, wherein the tool information received from the newly connected network tool device comprises tool identification information, and wherein the tool discovery engine is further configured to use the tool identification information to automatically obtain the relevant traffic information from the database.

19. The network tool optimizer device of claim 18, wherein the tool discovery engine is further configured to use tool identification information received from a user of the NTO device to automatically obtain additional relevant traffic information from the database.

20. The network tool optimizer device of claim 17, wherein the tool processor is further configured to update the database over time during operation of the NTO device.

21. The network tool optimizer device of claim 16, wherein the tool received from the newly connected network tool device comprises the relevant traffic information.

22. The network tool optimizer device of claim 21, wherein the tool discovery engine is further configured to receive the relevant traffic information from the newly connected network tool device through an application programming interface.

23. The network tool optimizer device of claim 21, further comprising a data storage medium, and wherein the tool processor is further configured to store the relevant traffic information received from the newly connected network tool device within a database stored within the data storage medium.

24. The network tool optimizer device of claim 16, wherein the tool configuration engine is further configured to request user approval prior and to apply the packet forwarding rules only if user approval is received.

25. The network tool optimizer device of claim 24, wherein the tool configuration engine is further configured to request user approval using a message displayed through a graphical user interface.

26. The network tool optimizer device of claim 16, wherein the tool discovery engine is further configured to associate the newly connected network tool device with a previously connected network tool device based upon the tool information, to automatically obtain prior relevant traffic information related to the previously connected network tool device, and to use this prior relevant traffic information as relevant traffic information for the newly connected network tool device.

27. The network tool optimizer device of claim 16, wherein the tool discovery engine is further configured to analyze packets within new network input traffic received at an input port for the NTO device from a newly connected traffic source to determine if it represents new relevant network traffic for a connected network tool device, and wherein the tool configuration engine is further configured to generate and apply additional packet forwarding rules for the new relevant network traffic based upon the determination and to forward the new relevant network traffic from the new network input traffic to the connected network tool device.

28. The network tool optimizer device of claim 16, wherein the tool discovery engine is further configured to analyze packets within current network input traffic for the NTO device to identify packet types within the network input traffic, to determine if one or more of the identified packet types represent additional relevant network traffic for the newly connected network tool device, and wherein the tool configuration engine is further configured to generate and apply additional packet forwarding rules for the additional relevant network traffic based upon the determination and to forward the additional relevant network traffic from the network input traffic to the newly connected network tool device.

29. The network tool optimizer device of claim 16, wherein the tool discovery engine is further configured to obtain additional relevant traffic information from a user of the NTO device.

30. The network tool optimizer device of claim 16, wherein the tool configuration engine is further configured to automatically apply the packet forwarding rules without user approval.

* * * * *